(12) United States Patent
Helmreich

(10) Patent No.: US 7,731,523 B2
(45) Date of Patent: Jun. 8, 2010

(54) ELECTRIC CROSS CONNECTOR

(75) Inventor: Johannes Helmreich, Zwettl (AT)

(73) Assignee: Tyco Electronics Austria GmbH, Vienna (AT)

( * ) Notice: Subject to any disclaimer, the term of this patent is extended or adjusted under 35 U.S.C. 154(b) by 0 days.

(21) Appl. No.: 12/212,204

(22) Filed: Sep. 17, 2008

(65) Prior Publication Data

US 2009/0098765 A1 Apr. 16, 2009

(30) Foreign Application Priority Data

Oct. 11, 2007 (DE) .................... 10 2007 048 710

(51) Int. Cl.
*H01R 31/08* (2006.01)
(52) U.S. Cl. ............................................. 439/510
(58) Field of Classification Search .......... 439/510–512, 439/507, 715
See application file for complete search history.

(56) References Cited

U.S. PATENT DOCUMENTS

| 4,469,128 A | 9/1984 | Petrimaux et al. |
| 4,477,862 A | 10/1984 | Gonzales |
| 4,989,118 A | 1/1991 | Sorenson |
| 5,372,521 A | 12/1994 | Laudereau |
| 5,669,788 A | 9/1997 | Brockman |
| 7,026,896 B2 * | 4/2006 | Mikl et al. .................... 335/85 |

FOREIGN PATENT DOCUMENTS

| CH | 580 342 | 9/1976 |
| DE | 30 02 515 A1 | 7/1981 |
| DE | 33 12 002 C1 | 5/1984 |
| DE | 42 25 573 A1 | 2/1993 |
| DE | 195 42 628 C1 | 2/1997 |
| EP | 0 387 158 A1 | 9/1990 |
| EP | 0 893 859 B1 | 1/1999 |
| WO | 2006/045860 A1 | 5/2006 |

* cited by examiner

*Primary Examiner*—Javaid Nasri
(74) *Attorney, Agent, or Firm*—Barley Snyder LLC

(57) ABSTRACT

The invention relates to a modular electric cross connector for producing an electrically conductive connection, in particular of electric contacts (20) of relay sockets, comprising a carrier (100) and an electric bridge (200) partially received on/in the carrier (100), by means of which bridge the electrically conductive connection can be produced, wherein the carrier (100) can be mechanically connected by means of a mechanical plug connection to at least a second electric cross connector (1).

11 Claims, 6 Drawing Sheets

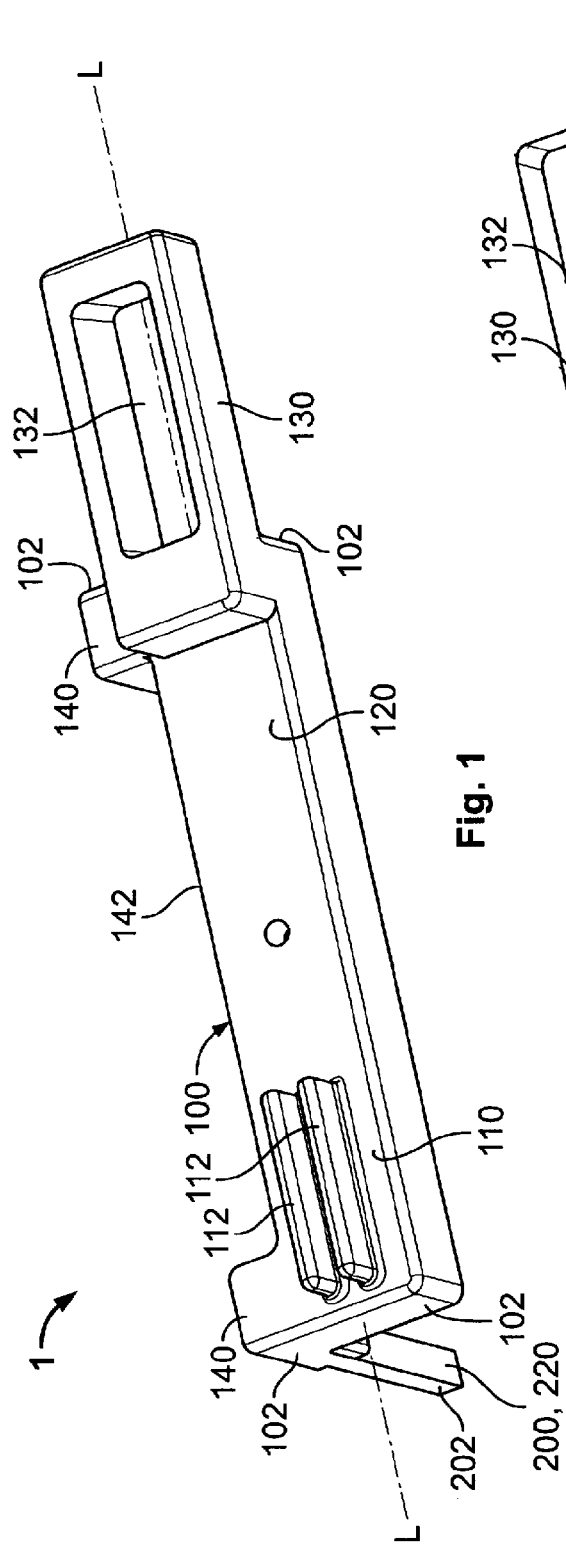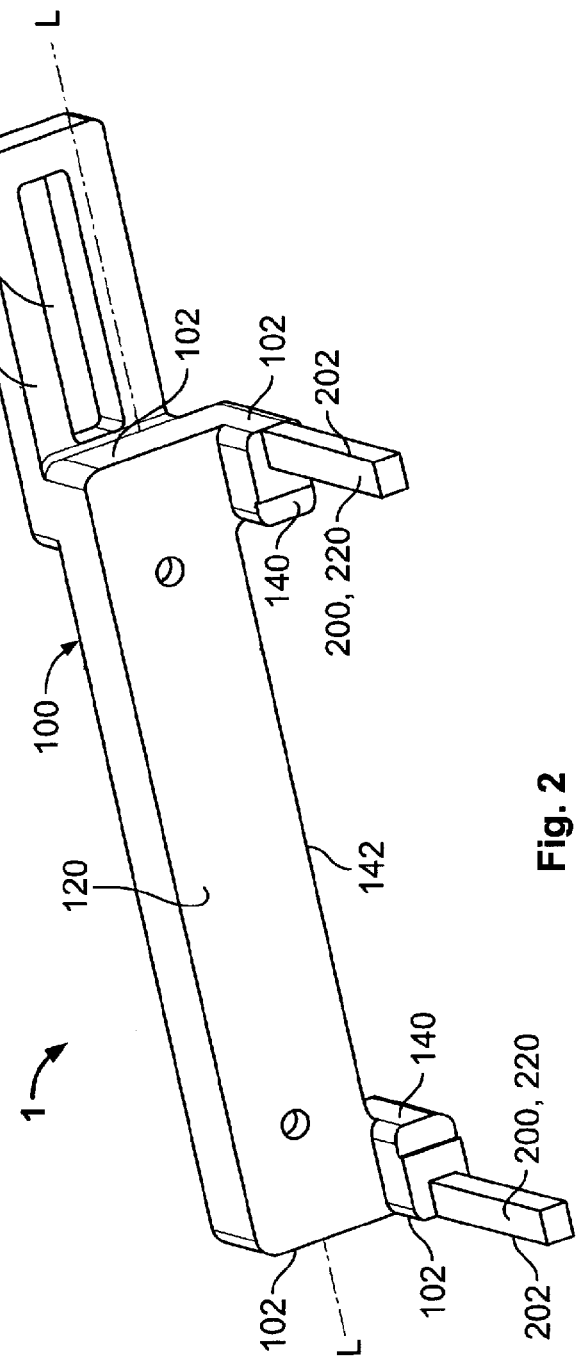

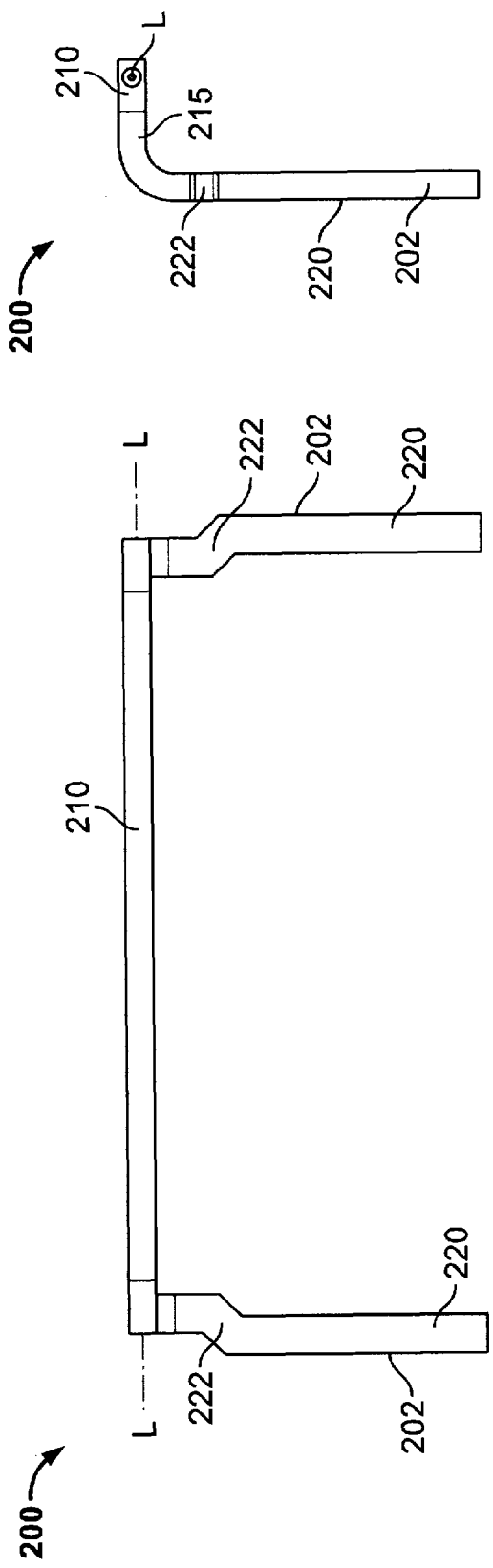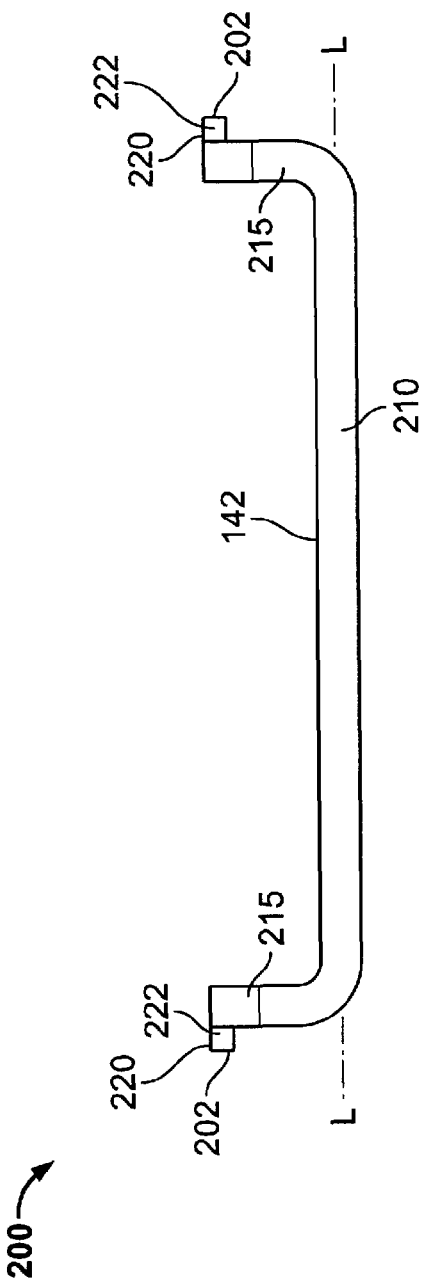

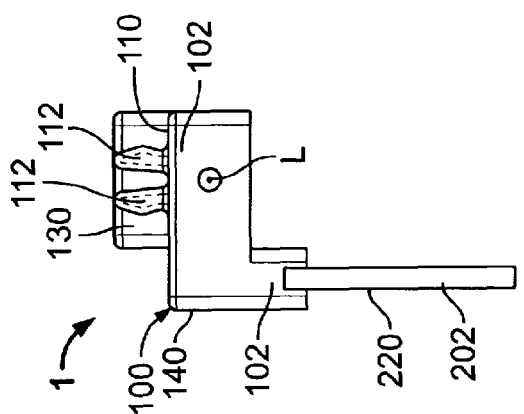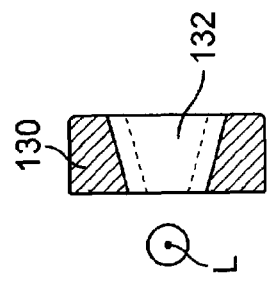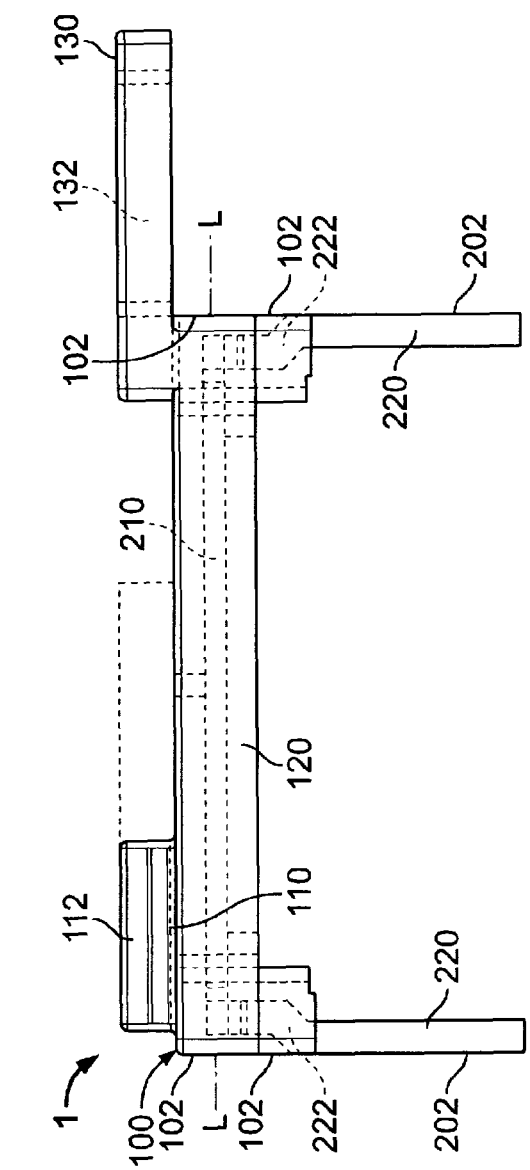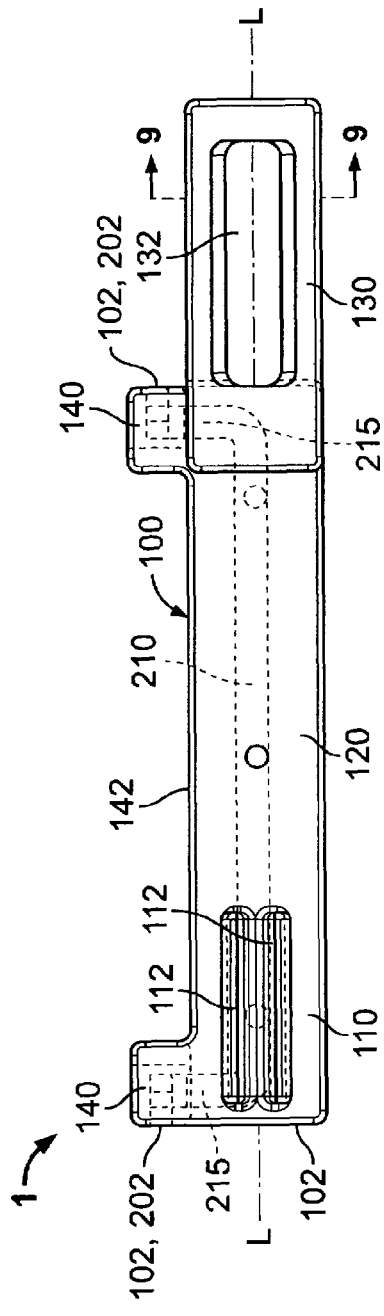

ELECTRIC CROSS CONNECTOR

CROSS-REFERENCE TO RELATED APPLICATIONS

This application claims the benefit of the filing date under 35 U.S.C. §119(a)-(d) of German Patent Application No. 10 2007 048 710.1, filed Oct. 11, 2007.

FIELD OF THE INVENTION

The invention relates to an electric cross connector for producing an electrically conductive connection, and more particularly to electric contacts of relay sockets. The invention furthermore relates to a use of an electric cross connector according to the invention for one or a plurality of relay sockets.

BACKGROUND

For applications in machine and plant construction and in automotive engineering and for building automation, there are a large number of relays or relay families. These include, for example, vehicle relays, multimode relays and performance relays with one or a plurality of changeover contacts. Modularly constructed relays as well as associated, likewise modularly constructed relay sockets have proven successful in industry, it being possible to plug the relays, depending on the application, onto a relevant relay socket corresponding thereto.

In many applications, it is necessary to electrically connect a plurality of relays to one another through their electric contacts in the relay socket. For this purpose there are what is known as electric cross connectors which can be plugged into holders of the relay sockets. Using these cross connectors, a plurality of electric potentials can be electrically connected to one another in parallel. The cross connector is, in this case, plugged into the holders of a plurality of adjacent relay sockets, one holder in each case still remaining free. Assembly of the cross connector on the relay socket takes place from above or laterally, so the cross connector is also easily visible when plugged in.

Electric cross connectors are used in the electric input of the relevant relay for looping through the coil voltage, in other words to electrically connect the coil contacts. In the electric output of the relays, a plurality of supply voltages, for example signal or actuator circuits, may be electrically connected. A visual control can take place here by means of LEDs.

A plurality of electric cross connectors are known from the prior art. Thus, U.S. Pat. No. 4,469,128 discloses an electric cross connection device for a pneumatic control system. Furthermore, DE 42 25 573 A1 discloses an electric connection module part for subassemblies of a modular automation apparatus. Moreover, DE 30 02 515 A1, U.S. Pat. No. 5,372,521, DE 33 12 002 C1 and DE 195 42 628 C1 disclose electric cross or series connectors with a comb-like configuration of the electric contact springs. Furthermore CH 580 342 A5 and EP 387 158 A1 in each case disclose a block-like electric connection for an electric apparatus.

U.S. Pat. No. 4,477,862 discloses an electric series pin plug for a bus circuit board or backplane of a control apparatus or mechanism. The electric series pin plug has a substantially U-shaped plastic material housing in cross-section with pin plugs received therein. The pin plugs are in this case received in two mutually parallel rows inside the housing.

EP 893 859 A1 discloses a comb connector for interfaces for relays. The comb connector in this case has a housing made of an electrically insulating material, and, embedded therein, an electric connection member, which projects at right angles from the flat housing with a large number of electric pin contacts. The comb connector has in each case, between two mutually directly adjacent pin contacts, a bridging portion with a predetermined breaking point on the electrically insulating material of the housing.

If a comb connector with a specific number of electric pin contacts is desired here, an adequately long comb connector is severed using a cutting tool at the corresponding predetermined breaking point. This free end can then be insulated with respect to wear and therefore electrically by a separate component configured as a covering cap. In order to guarantee a secure seat of the covering cap at the free end of the comb connector which has been cut to length, a remaining bridging portion of the housing and the covering cap have mutually corresponding latching elements.

One embodiment of a comb connector of this type has, for example, six electric pin contacts and has to be—if a smaller variant is desired—severed with the cutting tool. In the comb connector, a connection member between two electric pin contacts consists of the metal portion connecting the two electric pin contacts and the plastic material housing. In order to obtain a functioning smaller comb connector than the original one, in addition to the severing by the cutting tool, an additional part is necessary, namely the end covering cap, to completely electrically insulate the comb connector again. Moreover, the separated part of the comb connector can no longer be used and is therefore waste.

An object of the invention is to provide an improved electric cross connector for producing an electrically conductive connection. The latter should be suitable, in particular, for an electrically conductive connection of electric contacts of relay sockets.

SUMMARY

An electric cross connector according to the invention should, in this case, be configurable such that any desired number of electric contacts can be electrically conductively connected to one another with a cross connector. This should be possible with only one single plugging process. Furthermore, the cross connector according to the invention should be constructed in such a way that no waste is produced for any desired electric multiple contacting. Moreover, the cross connector according to the invention should be handleable without a tool and be suitable for electric contacts located at different distances apart from one another, even within a single arrangement. Furthermore, no further parts, such as, for example, the above-mentioned covering cap should be necessary for one or for a plurality of electric connections, apart from the cross connector itself.

The invention is achieved by means of a modular electric cross connector for producing an electrically conductive connection. The modular electric connector according to the invention has a carrier and an electric bridge partially received on/in the carrier, by means of which an electrically conductive connection can be produced. It is in this case possible to mechanically connect the carrier of the modular electric connector by means of a mechanical connection or a mechanical interconnection to at least a second electric connector. A re-releasable mechanical connection or a re-releasable mechanical interconnection is preferred here.

The carrier of the modular electric cross connector may be correspondingly configured in this case to set up this mutual connection of two cross connectors. In other words, the carrier of the cross connector or the respective carrier of a large number of cross connectors is configured in this case in such a way that two or more electric cross connectors can be connected to one another by a non-positive and/or positive mechanical connection. In this case, it is preferred that not only two electric cross connectors, but a plurality of cross connectors, can be fastened to one another by means of the mechanical connection according to the invention or the mechanical interconnection according to the invention. The mechanical connection or the mechanical interconnection is in this case may be a plug, snap-on, latch, fit, pinch, clip and/or clamp connection.

The modular structure may be a releasable mechanical connection between the electric cross connectors means that they can be plugged together as often as desired in any number and released again. A connecting member of two cross connectors according to the invention is implemented exclusively by means of the carrier constructed from plastic material. An electric connection is implemented by means of the electric bridge provided on/in the carrier, the electric contact pins of which bridge projecting from the carrier can be plugged into electric contacts of an electric apparatus or an electric device/mechanism, for example a holder of a relay socket.

According to the invention, no tool is necessary for plugging together and also releasing the modularly constructed electric cross connectors. Moreover, no waste occurs when producing a single or a plurality of electric connections. According to the invention, an electric multiple connection can be produced, a single connection according to the invention becoming a multiple cross connection according to the invention by means of a simple plugging together of a plurality of single cross connectors. No further electric insulation parts, such as for example, covering caps or the like are necessary.

In an embodiment of the invention, each modular electric cross connector has two fastening portions. Here, the fastening portions of a single cross connector are configured in each case in such a way that each of these two fastening portions can be fastened to one of the two other fastening portions of another cross connector. In other words, each cross connector may be configured in such a way that one can be fastened to all the others or all the others can be fastened to one another, in each case. This also means that the two fastening portions of a single cross connector could be fastened to one another if they are not configured on/in a single cross connector. According to the invention, the carrier of each cross connector is configured in such a way that its two fastening portions are mutually corresponding fastening portions so to speak; they are, a positive and a negative of a fastening or a mechanical interconnection, or a mechanical connection.

In embodiments of the invention, a first fastening portion of the modular electric cross connector is a joining portion and a second fastening portion is a receiving portion. According to the invention, a joining portion of a second cross connector can be provided at least partially in the receiving portion of a cross connector. In other words, the receiving and joining portions may be configured so as to be mutually corresponding as a plug, snap-on, latch, fit, pinch, clip and/or clamp connection.

In embodiments of the invention, the modular electric cross connector has a lug, which projects laterally outwardly from the electric bridge of the cross connector. According to the invention, the receiving or joining portion is then provided on or in the lug. Corresponding with this, in one region of a web of the electric bridge, the corresponding joining or receiving portion is provided on/in the cross connector.

The receiving and/or the joining portion of the modular electric cross connector may be located with respect to one another substantially symmetrically in relation to a section plane, which passes centrally through the cross connector in the longitudinal extension thereof. It is preferred here for this section plane to be located perpendicularly with regard to a longitudinal centre line of the cross connector. The receiving and the joining portion, may be aligned with a longitudinal direction of the cross connector; in other words are located substantially parallel to the longitudinal centre line of the cross connector. It may be also the case here that the respective fastening portion is itself similar with regard to a longitudinal direction of the cross connector; this may also mean it is configured substantially symmetrically with regard to a longitudinal direction of the cross connector and/or can also be substantially mapped on itself.

To secure two modular electric cross connectors to one another, these may be moved in a translatory manner toward one another and the joining portion of one cross connector is inserted or plugged into the receiving portion of the other cross connector. This may also take place additionally or solely by a rotary movement, i.e. the insertion or plugging of the joining portion into the receiving portion does not (only) take place in a straight line but the fastening of the two cross connectors with respect to one another is produced successively, i.e. one fastening portion no longer snaps in, when producing the fastening, between the two in one moment, but an end position of the mutual fastening is achieved by means of a continuous "snapping in". In this case, one cross connector carries out a relative rotational movement with respect to the other, during which for example a mutual latching is continuously established.

In one embodiment of the invention, the first fastening portion has a projection or a fastening strip, whereas the second fastening portion has a recess or groove corresponding thereto. In this case, a dimension of the recess or the groove may be greater than a dimension of the projection or the fastening strip. This relates, in particular, to a length of the recess or groove, which may be greater than a length of the projection or the fastening strip. In this case, the respective length extends in the longitudinal direction of the modular electric cross connector. As a result of this, two cross connectors which are secured or connected to one another are provided so as to be displaceable or movable relative to one another within a certain range, so a width tolerance equalisation of two adjacent holders is possible, for example. Furthermore, with an adequate mobility of two cross connectors with respect to one another, the cross connector(s) according to the invention can be used for different holder widths or different spacings of holders with respect to one another.

According to the invention, the second fastening portion has a specific hollow profile, in which a corresponding profile of the first fastening portion can be snapped in, latched in, fitted in, pinched in, clipped in or clamped in. For this purpose, rectangular or partially rectangular, stepped, trapezoidal and/or dovetail-like hollow profiles, on which corresponding rounded, triangular or hook-shaped profiles can be placed, are particularly suitable.

The first fastening portion may be a single or two fastening strips located parallel to one another, which can be latched within the second fastening portion. The respective fastening strip may be a hook-shaped or a corresponding triangular profile, which may moreover be correspondingly rounded.

It is possible in embodiments of the invention to design a respective modular electric cross connector in such a way that in the case of two cross connectors connected to one another, the two electric bridges or the relevant electric contact pins of the two electric bridges rest on one another in an electrically contacting manner. This may take place by means of one longitudinal side of the two relevant contact pins. According to the invention, a lateral, outer limitation of the respective electric contact pin is provided here on the relevant cross connector in such a way that the contact pins, during the mechanical connection of two cross connectors, are provided on mutually relating, lateral, outer limitations of the two cross connectors. A respective end portion of the carrier may be configured here so as to be aligned with the lateral, outer limitation of the respective contact pin. In other words, a respective transverse side of the cross connector may be substantially located in a plane, in which an end face of the carrier and a longitudinal side of an electric contact pin is also arranged.

In embodiments of the invention, the two electric contact pins of an individual modular electric cross connector are arranged at a spacing with respect to a longitudinal direction or the longitudinal centre line of the cross connector, i.e. also, that it is preferred for the web of the electric bridge to not lie in one plane with the two electric contact pins. It is preferred here for a space of the carrier, between the two electric contact pins along the web of the electric bridge or along the carrier, to remain free in a comparatively large or long center region (longitudinal recess between the two continuations of the carrier, from which the electric contact pins project downwardly from the cross connector). As a result, it is possible according to the invention for the cross connectors to not only be provided serially on holders, but also at least partially in parallel.

A spacing of the two electric contact pins of a single, modular electric cross connector according to the invention can, of course, also be freely selected depending on a grid width of the holders or the electric contacts. With the aid of this grid width, a size or length of the two fastening portions can then also be selected. In other words, an individual fastening portion may, in this case, be a maximum of just as long or as large as half the grid width. If this is not necessary, a bridging portion may be provided between the two fastening portions of the carrier.

BRIEF DESCRIPTION OF THE DRAWINGS

Further preferred embodiments of the invention emerge from the remaining dependent claims.

The invention will be described in more detail below with the aid of embodiments with reference to the accompanying drawings, in which:

FIG. 1 is a perspective view from above of a modular electric cross connector according to the invention;

FIG. 2 is a perspective view from below of the cross connector according to the invention from FIG. 1;

FIG. 3 is a side view of an electric bridge of the cross connector according to the invention;

FIG. 4 is an end view of the electric bridge from FIG. 3;

FIG. 5 is a plan view of the electric bridge from FIG. 3;

FIG. 6 is a side view of the cross connector according to the invention;

FIG. 7 is an end side view of the cross connector according to the invention;

FIG. 8 is a plan view of the cross connector according to the invention;

FIG. 9 is a sectional view of a fastening lug of the cross connector according to the invention along a section plane drawn in FIG. 8;

DETAILED DESCRIPTION OF THE EMBODIMENTS

Figure 10:
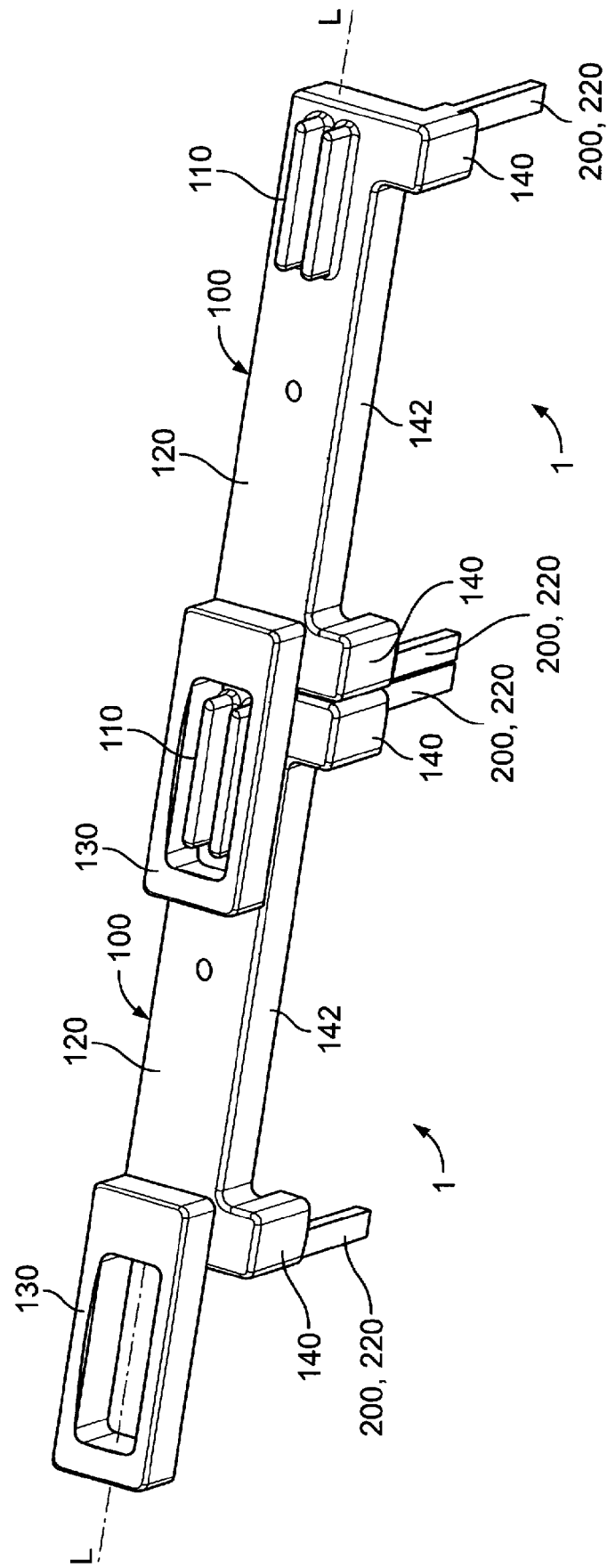
FIG. 10 shows the two cross connectors according to the invention secured to one another in a perspective view from above.

The invention will be described below substantially with the aid of an embodiment of a modular electric cross connector. However, according to the invention, a large number of embodiments of the cross connector is possible. One feature here is that the cross connector is modularly constructed, in other words, according to the invention, can be extended by substantially identically constructed cross connectors to form a multiple cross connector. Furthermore, it is preferred that the cross connector merely comprises one electric bridge and one carrier, which, on the one hand, holds the bridge and, on the other hand, allows the modular extendibility of the cross connector.

In the case of other embodiments according to the invention, it is possible, in particular, to provide the fastening portions of the modular electric cross connector configured so as to be different and at other positions. In particular, a kinematic reversal is possible here, for example in relation to the drawing. Furthermore, it is possible in embodiments of the invention, to provide the electric contact pins of the electric bridge at a position other than that shown in the drawing, the ideal extension thereof being able to intersect a longitudinal centre line of the cross connector, for example. Moreover, it is not necessary for the contact pins to be provided in one plane arranged parallel to the longitudinal centre line of the cross connector; i.e., one contact pin may have a larger spacing from the longitudinal centre line than the other contact pin. Furthermore, it is possible in embodiments of the invention for one contact pin to not be aligned with an outer or end face of the carrier or to not absolutely necessarily form an outer limitation of the cross connector. The description below will partially deal more closely with such embodiments of the invention.

FIGS. 1 and 2 show an embodiment of a modular electric cross connector 1 according to the invention in two perspective views. In this case, the cross connector 1 substantially has two components, a carrier 100 and an electric bridge 200 connected thereto, which can best be seen, i.e. without the carrier 100, in FIGS. 3 to 5.

The electric bridge 200 substantially comprises an electric web 210, on the two longitudinal ends of which an electric contact pin 220 is provided in each case. The respective contact pin 220 in this case may adopt substantially a right angle with the web 210. See in this regard FIG. 3 in particular. Other angles, even respective different ones can, of course, also be applied between the web 210 and the respective contact pin 220.

The electric bridge 200 can now be configured such that the web 210 and the two electric contact pins 220 are located substantially in one plane (not shown in the drawing) and, in a side view (similar to FIG. 3), have a simple U-shaped configuration, and, in an end face view (similar to FIG. 4) and a plan view (similar to FIG. 5), have a simple I-shaped configuration.

In other embodiments of the invention it is possible, however, to provide the electric contact pins 220 offset at a certain spacing with regard to the web 210 of the electric bridge 200, and this can easily be seen in FIGS. 4 and 5. The contact pins 220 are integrally connected here to the web 210 by means of a transition portion 215. This gives the bridge 200 a U-shaped appearance in a side view (FIG. 3), an L-shaped appearance in an end face view (FIG. 4) and a U-shaped appearance again in a plan view (FIG. 5).

The respective transition portion 215 is angled here in a plane of the web 210 at right angles therefrom, bridges a certain distance in this plane (FIG. 5) and then in turn passes at a right angle into the relevant contact pin in a plane arranged substantially at right angles to the first plane (FIG. 4). In other words, the transition portion 215 substantially has the form of a three dimensional "S", one longitudinal end portion of this "S" being provided bent from an original plane through 90°.

In an embodiment of this type, the electric contact pins 220 are arranged at a certain spacing with respect to a longitudinal centre line L of the electric bridge 200 or the web 210 thereof. This longitudinal centre line L is also the longitudinal centre line L of the modular electric cross connector 1 or the carrier 100 thereof. A corresponding longitudinal direction L of the cross connector 1 is also meant by L.

To allow a respective electric contact pin 220 to be aligned with a lateral, outer limitation 102 of the carrier 100, the relevant contact pin 220 has a bend 222, which displaces the respective contact pin 220 further outward, into a region in the longitudinal direction L outside the web 210; see also FIGS. 6 and 7 here. In other words, a lateral, outer limitation 202 of the electric bridge 200 or a lateral, outer limitation 202 of the contact pin 220 is aligned with the end, outer limitation 102 of the carrier 100.

Figure 11:
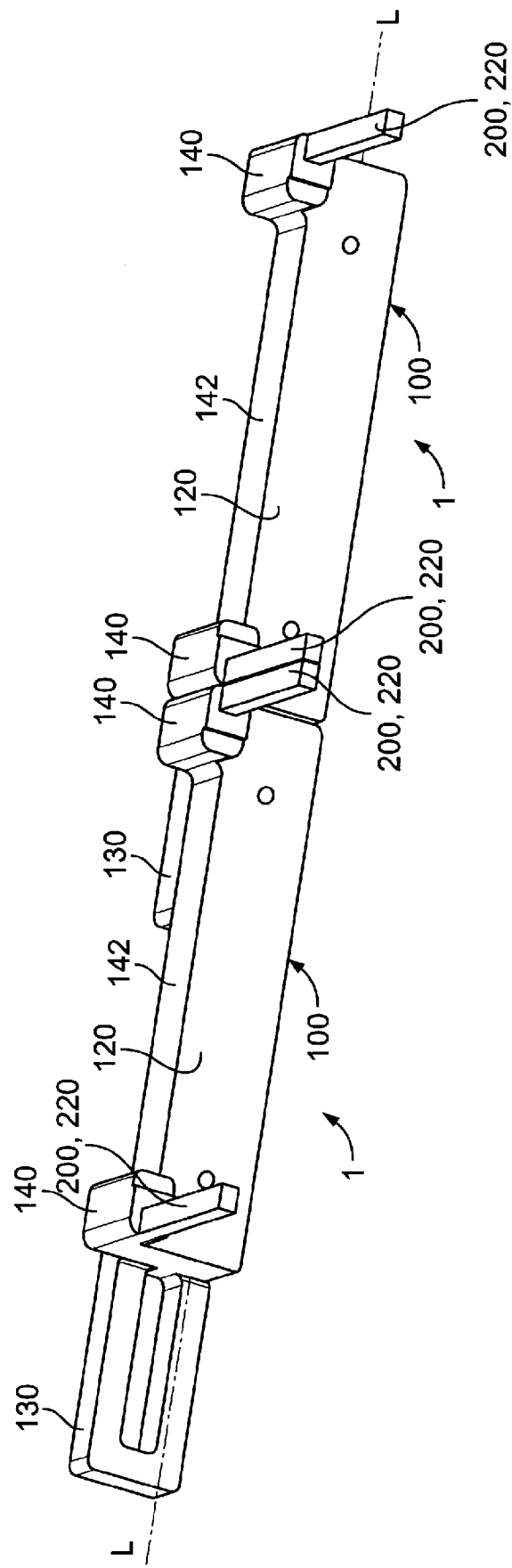
FIG. 11 shows the two cross connectors according to the invention from FIG. 10 in a perspective view from below.
Figure 12:
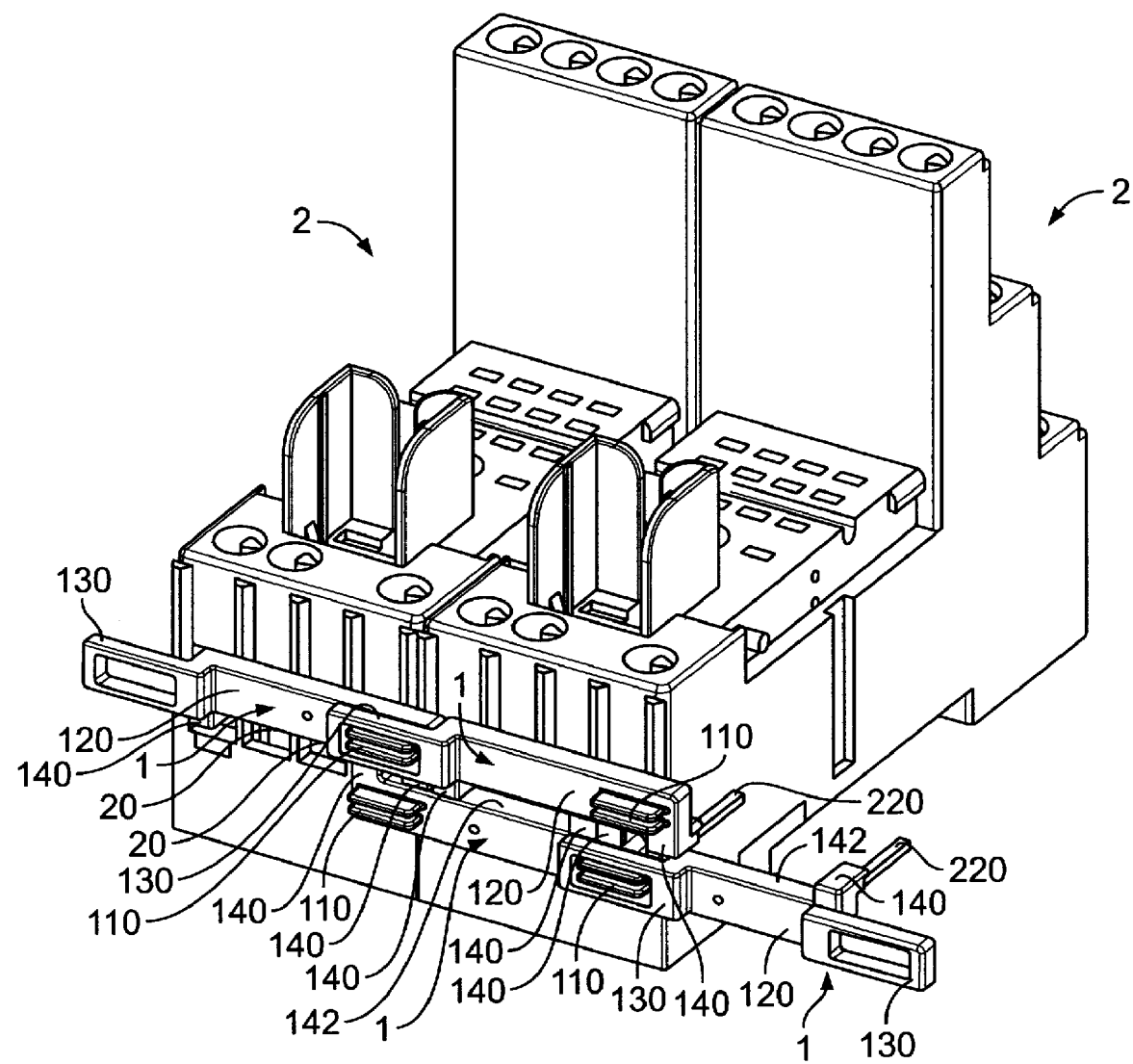
FIG. 12 is a perspective view of a use according to the invention of a plurality of cross connectors according to the invention.

It is consequently possible, when connecting two modular electric cross connectors 1 to provide two electric contact pins 220 directly resting on one another, which can then be plugged together into an electric (jack) contact 20, for example a holder of a relay socket 2; see in this regard FIGS. 10 to 12. As a result, an electrically conductive connection of two directly adjacent cross connectors 1 is also produced outside the relevant contact 20.

The electric bridge 200 is held by the carrier 100. The bridge 200 may be provided here in portions inside the carrier 100. It is furthermore possible to provide the bridge 200 only on the carrier 100 (not shown in the drawing). Moreover, it is possible to provide that portion of the bridge 200 which is held by the carrier 100 only partially inside the carrier 100. In an embodiment of this type, the web 210, for example, can then be seen in the region of a bridging portion 120 of the carrier 100.

In the embodiment shown, the electric bridge 200 is provided with its web 210 inside the carrier 100. It is preferred here for at least one region of the relevant transition portion 215 of the bridge 200 to also be provided inside the carrier 100. In the embodiment shown in the drawing, a portion of the transition portion 215 of the relevant contact pin 220 is provided inside a continuation 140, which is configured on the carrier 100.

Pointing away from the respective continuation 140, the two contact pins 220 then project downwardly from the carrier 100, and this can easily be seen in FIG. 2. The continuation 140 may not only be configured laterally on the carrier, but may also extend away downwardly (with reference to FIG. 2). A limitation side of the continuation 140 is a portion of the end, outer limitation 102 of the carrier 100, which is may be aligned with the lateral, outer limitation 202 of the contact pin 220.

The carrier 100 is structured to extend primarily along the longitudinal direction L of the modular electric cross connector 1 and substantially as a cuboid. The web 210 of the electric bridge 200 is received inside this cuboidal carrier 100. Two fastening portions 110, 130 are configured on this cuboid and are connected to one another by the bridging portion 120 which is a longitudinal portion of the carrier 100.

The two fastening portions 110, 130 of the carrier 100 are configured as fastening portions 110, 130 corresponding with one another. In other words, if the fastening portion 130 could be removed or released from the carrier 100, it could undergo a non-positive and/or positive mechanical connection or a non-positive and/or positive mechanical interconnection with the fastening portion 110 of the same carrier 100, which connection or interconnection may be configured as a mechanical plug connection.

According to the invention, a mechanical plug connection should be taken to mean all non-positive or positive, or non-positive and positive, mechanical connections/interconnections. In particular this should be taken to mean a snap-on, latch, fit, pinch, clip, clamp or a special plug connection, which may be configured to be releasable. It is, of course, also possible to use non-releasable mechanical connections/interconnections.

It is possible, owing to the configuration of the two fastening portions (110, 130) as a positive (110, 130) and a negative (130, 110) to provide two modular electric cross connectors 1 secured to one another, and this can easily be seen in particular in FIGS. 10 and 11. In the present embodiment, the first fastening portion 110 is configured as a joining portion and the second fastening portion 130 is configured as a receiving portion. This may, obviously, also be kinematically reversed.

In preferred embodiments of the invention, the first fastening portion 110, configured as the joining portion, of a modular electric cross connector 1 for connection to the second fastening portion 130, configured as the receiving portion, of a second cross connector 1 has a correspondingly configured projection 112. This projection 112 may be, for example, a latching projection, a latching hook or, as shown in the drawing, a fastening strip.

Corresponding with this, the second fastening portion 130, configured as a receiving portion, has a recess 132, which is configured in such a way that it can undergo the non-positive and/or positive mechanical connection with the projection 112. The recess 132, may, for example, be configured as a general recess, a latching recess or a groove. As shown in the drawing, the recess 132 is a through-recess in/on which the projection 112, configured as a fastening strip of the second modular electric cross connector 1, can be latched.

The first fastening portion 110—for example configured as a joining or receiving portion—is configured on a longitudinal end portion of the web 210 of the electric bridge 200 on the carrier 100. The second fastening portion 130—configured for example as a receiving or joining portion—is configured as a lug on the carrier 100 in the present embodiment.

The bridging portion 120 of the carrier 100 may be provided between the first fastening portion 110 and the second fastening portion 130. A length of the bridging portion 120 is measured, on the one hand, according to a length of the first fastening portion 110 and, on the other hand, according to an average spacing of two short-circuiting electric contacts 20. It is possible to configure the first fastening portion 110 reaching up to the second fastening portion 130, no bridging portion 120 then being provided (not shown in the drawing).

The second fastening portion 130, configured as a lug, may be provided projecting outwardly from a base body (cuboid) of the carrier 100 in the longitudinal direction L from the bridging portion 120. Furthermore, it is preferred for the lug to be arranged at the top with reference to FIGS. 1 and 2, on the cuboidal carrier 100 in the region of the bridging portion 120. According to the invention, the recess 132 or the projection 112 is provided on/in the lug. If the lug has the projection 112, this is configured at the bottom with reference to FIGS. 1 and 2. Corresponding with this, the recess 132 which corresponds with this, is then located in the first fastening portion 110 and may be configured as a groove which is undercut in cross-section.

In the present embodiment, the second fastening portion 130 (configured as a lug) has the recess 132, configured as a through-recess, for latching to the first fastening portion 110 of the second modular electric cross connector 1. The projection 112, configured as fastening strip, of the second cross connector 1 can engage in this though-recess 132, and this is shown in FIG. 10.

The projections 112, configured as fastening strip, may comprise two fastening strips, which may be placed on the two longitudinal sides or longitudinal edges of the recess 132, configured as a through-recess, and can latch there. A latching, which may also be exclusive, is of course possible on one or the two transverse sides of the recess 132, configured as a through-recess. The recess 132, configured as a through-recess, may extend up to an end, outer limitation 102 of the carrier, and this can easily be seen in FIGS. 2 and 11.

In embodiments of the invention, both the projection 112 and the recess 132 are provided to extend in the longitudinal direction L of the modular electric cross connector 1, it being preferred that the recess 132 is longer than the projection 112. This produces a mutual displaceability of two cross connectors 1 connected to one another, it being possible to compensate tolerances on sides of the cross connector 1 and also on sides of the electric contacts 20 of an electric apparatus 2, for example the relay sockets 2 shown in FIG. 12.

A respective length of the projection 112 or the recess 132 primarily depends on stability aspects of a plurality of modular electric cross connectors 1 plugged together. The longer the respective projection 112 or the respective recess 132, the stronger it is possible to make a latching between two directly adjacent cross connectors 1 and the more difficult it also is, however, to produce this mutual latching or to release it again. A variable length of the projection 112 is shown by dashed lines in FIG. 6. The procedure is then also similar with a corresponding recess 132 (not shown).

In embodiments of the invention, the electric bridge 200 bent from a wire polygonal in cross-section, in particular square. In particular, it is possible by means of a rectangular, for example square, configuration of this cross-section for two mutually fastened modular electric cross connectors 1 to abut flat with their relevant contact pins 220, with faces 202 abutting each other, and thereby produce an electrically conductive connection. This can easily be seen, in particular, in FIGS. 10 and 11. It is obviously possible to use other cross-sections for the electric bridge 200. In particular, a round cross-section is suitable for this.

FIG. 9 shows a sectional view of the second fastening portion 130, configured as a lug, in the region of its recess 132, configured as a through-recess. The through-recess is configured and provided in such a way here that it can latch with the first fastening portion 110, configured as the joining portion, or the projection 112 thereof. In the present embodiment, the cross-sections of the recess 132, configured as a through-recess, along the entire extension thereof in the longitudinal direction L have substantially the shape of a central section through a truncated cone. In other words, the longitudinal walls of the recess 132, configured as a through-recess, adopt an angle which differs from 0° or 180° with respect to one another. This recess 132, configured as a through-recess, extending in a V-shape cut in cross-section can easily be seen in FIG. 9.

Corresponding with this, the two projections 112, configured as fastening strips, are configured and provided on the first fastening portion 110. Each projection 112, configured as fastening strip, is substantially constructed so as to be triangular in its cross-section, and a maximum spacing in a transverse direction of the cross connector 1, between the two projections 112, configured as fastening strips, is greater than a minimum spacing of the two walls in the transverse direction of the recess 132.

When plugging together the two fastening portions 110, 130, the two projections 112, configured as fastening strips, coming from the narrower side of the recess 132, are plugged therein, the two projections 112, configured as fastening strips, being moved toward one another. If the maximum spacing of the projections 112, configured as fastening strip, passes the narrowest point of the through-recess (to be seen on the left in FIG. 9), the two projections 112, configured as fastening strips, snap into the through-recess and the two modular electric cross connectors 1 are fixed to one another, and this can easily be seen in FIG. 10.

In embodiments of the invention, the electric web 210 and the electric contact pins 220 of the electric bridge 200 do not lie in one plane. It is preferred here for the two electric contact pins 220 to span a plane, with respect to which the web 210 is arranged in parallel, and this can easily be seen in FIGS. 5, 8 and 10. It is preferred here for the transition portion 215, which connects the web 210 with the respective electric contact pin 220, to be arranged inside the carrier 100.

The carrier 100 may have continuations 140 for this, which are located on a respective longitudinal end portion of the carrier 100 and extend in the transverse direction. These continuations 140 in each case take up a part of the transition portion 215 and a portion of the electric contact pin 220, extending away therefrom in each case, of the electric bridge 200. Owing to this offset or stepped configuration of the web 210 with the two contact pins 220, it is possible, to provide at least two modular electric cross connectors 1 in parallel on an electric apparatus 2, and this can be seen by way of example from the relay sockets 2 shown in FIG. 12.

It is possible as a result, to always allow at least two directly mutually adjacent electric contacts 20 to be electrically contacted by two different cross connectors 1 and to thus connect them to different electric potentials. Moreover, it is possible to provide two cross connectors 1 arranged in parallel with a respective electric contact pin 220 in a single contact 20, i.e. a single holder, of the relay socket 2. It is preferred here, for two cross connectors 1 arranged in parallel, with the relevant electric contact pins 220, to also rest on one another, as shown in FIGS. 10 and 11 for example.

In other words, the continuation 140 and/or the electric bridge 200 are configured in such a way that, on the one hand, as shown in FIG. 10, a direct lateral abutment of two electric contact pins 220 may be made possible, and also a direct abutment of two electric contact pins 220 of two modular electric cross connectors 1, which are located parallel to one another.

According to the invention, modular electric cross connectors 1 which are different from one another may be provided and can be at least partially secured to one another. This relates, in particular, to different lengths of the relevant bridging portions 120; 120. More flexibility in the electric bridging can thereby be achieved.

It is possible, for example, to provide a modular electric cross connector 1 for a single grid width and a modular electric cross connector 1 for a double grid width. The relevant fastening portions 110, 130; 130, 110 of the two different cross connectors 1; 1 may be in this case constructed correspondingly, so different cross connectors 1; 1 can also be plugged together.

It is also possible according to the invention to configure the electric contact pins 220 as electric contact jacks. A relevant length of the contact pins 220 or the contact jacks may be no longer than a depth or a length of the relevant electric contact 20 (jack contact/holder or pin contact).

What is claimed is:

1. A modular electric cross connector for producing an electrically conductive connection comprising:
    a carrier and an electric bridge partially received by the carrier, by means of which bridge the electrically conductive connection is produced, wherein the carrier is mechanically connected by means of a mechanical plug connection to at least one other electric cross connector;
    an electrical web of the electrical bridge located in the region of a bridging portion of the carrier;
    a fastening portion configured as a lug on the carrier, the lug projecting laterally outwardly from the electrical web and pointing away from the electric bridge;
    wherein the carrier and mechanical plug connection are positioned along a longitudinal center line of the modular electric cross connector, the mechanical plug connection positioned at longitudinal ends of the carrier, the lug disposed symmetrically with respect to the longitudinal center line of the modular electric cross connector.

2. The modular electric cross connector according to claim 1, wherein the carrier of the modular electric cross connector is configured in such a way that two electric cross connectors is connected to one another by means of a non-positive and/or positive mechanical connection.

3. The modular electric cross connector according to claim 1, wherein the carrier of the modular electric cross connector is configured in such a way that the mechanical connection of two electric cross connectors is produced by means of a snap-on, latch, fit, pinch, clip or clamp connection.

4. The modular electric cross connector according to claim 1, wherein the carrier of the modular electric cross connector is configured in such a way that two fastening portions of a single carrier are configured as mutually corresponding connection partners for a mechanical connection.

5. The modular electric cross connector according to claim 4, wherein the carrier, as a first fastening portion, has a joining portion and, as a second fastening portion, has a receiving portion, and a carrier of the other modular electric cross connector, also having a joining portion, can be at least partially received on/in the receiving portion of the modular electric cross connector.

6. The modular electric cross connector according to claim 5, wherein the receiving portion has a recess or a groove, and the joining portion has a projection or a fastening strip, wherein, for an equalization of width tolerances, a dimension of the recess or a length of the groove may be greater than a dimension of the projection or a length of the fastening strip.

7. The modular electric cross connector according to claim 6, wherein the recess or the groove of the receiving portion has, in a cross section, an at least partially rounded, stepped, rectangular, trapezoidal or dovetail-shaped profile, and the projection or the fastening strip of the joining portion, in a corresponding cross-section, has a profile, which can be latched to the profile of the recess or the groove.

8. The modular electric cross connector according to claim 5, wherein the joining portion has an individual fastening strip or at least two fastening strips which are arranged substantially parallel to one another which have, in their respective cross-section, an at least partially triangular profile, the profile of a hook or a latching hook and/or, at least partially, a rounded profile.

9. The modular electric cross connector according to claim 1, wherein a lateral outer limitation of the electric bridge is provided on the modular electric cross connector in such a way that it rests on a relevant lateral outer limitation of an electric bridge of the second modular electric cross connector when mechanically connecting two modular electric cross connectors.

10. The modular electric cross connector according to claim 1, wherein the electric bridge is configured in such a way and provided with respect to the carrier in such a way that a lateral outer limitation of the carrier is aligned with the lateral, outer limitation of the electric bridge.

11. The modular electric cross connector according to claim 1, wherein an electric contact pin of the electric bridge is provided offset in the modular electric cross connector with respect to a longitudinal direction or a longitudinal center line of the modular electric cross connector.

* * * * *